(12) United States Patent
Baron et al.

(10) Patent No.: US 9,467,451 B1
(45) Date of Patent: Oct. 11, 2016

(54) GENERIC PROACTIVELY-SECURE SECRET-SHARING PROTOCOL FROM ANY SUITABLE HONEST-MAJORITY SECRET-SHARING PROTOCOL

(71) Applicant: HRL Laboratories, LLC, Malibu, CA (US)

(72) Inventors: Joshua W. Baron, Los Angeles, CA (US); Karim El Defrawy, Santa Monica, CA (US); Joshua D. Lampkins, Gardena, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/815,427

(22) Filed: Jul. 31, 2015

Related U.S. Application Data (63) Continuation-in-part of application No. 14/054,655, filed on Oct. 15, 2013, and a continuation-in-part of application No. 14/449,868, filed on Aug. 1, 2014, which is a continuation-in-part of application No. 14/207,483, filed on Mar. 12, 2014, said application No. 14/815,427 is a continuation-in-part of application No. 14/477,613, filed on Sep. 4, 2014, which is a continuation-in-part of application No. 14/207,483, filed on Mar. 12, 2014, and a continuation-in-part of application No. 14/449,868, filed on Aug. 1, 2014, and a continuation-in-part of application No. 14/449,115, filed on Jul. 31, 2014, which is a continuation-in-part of application No. 14/207,321, filed on Mar. 12, 2014.

(60) Provisional application No. 61/780,795, filed on Mar. 13, 2013, provisional application No. 61/780,638, filed on Mar. 13, 2013, provisional application No. 61/780,757, filed on Mar. 13, 2013, provisional application No. 61/861,334, filed on Aug. 1, 2013, provisional application No. 61/861,325, filed on Aug. 1, 2013, provisional application No. 62/032,338, filed on Aug. 1, 2014.

(51) Int. Cl.
*H04L 29/06* (2006.01)

(52) U.S. Cl.
CPC ............... *H04L 63/10* (2013.01); *H04L 63/20* (2013.01)

(58) Field of Classification Search
CPC .... H04L 9/085; H04L 9/3218; H04L 9/0891
USPC .......................................................... 726/26
See application file for complete search history.

(56) References Cited

U.S. PATENT DOCUMENTS

| | | |
|---|---|---|
| 4,633,470 A | 12/1986 | Welch et al. |
| 4,926,479 A | 5/1990 | Goldwasser et al. |
| 5,625,692 A * | 4/1997 | Herzberg ............... H04L 9/085 380/286 |

(Continued)

OTHER PUBLICATIONS

Schultz, David Andrew. Mobile proactive secret sharing. Diss. Massachusetts Institute of Technology, 2007.*

(Continued)

*Primary Examiner* — Syed Zaidi
(74) *Attorney, Agent, or Firm* — Tope-McKay & Associates (57) ABSTRACT

Described is system for transforming a SHARE protocol into a proactively secure secret sharing (PSS) protocol. A PREFRESH protocol is performed that includes execution of the SHARE protocol. The PREFRESH protocol refreshes shares of secret data among multiple parties. The SHARE protocol is a non-proactively secure secret sharing protocol.

18 Claims, 3 Drawing Sheets

(56) References Cited

U.S. PATENT DOCUMENTS

| | | | |
|---|---|---|---|
| 6,035,041 A | 3/2000 | Frankel et al. | |
| 7,003,677 B1* | 2/2006 | Herzberg | H04L 9/0833 380/286 |
| 7,313,701 B2* | 12/2007 | Frankel | G06Q 20/382 705/64 |
| 7,327,847 B2 | 2/2008 | Cachin | |
| 2004/0139146 A1 | 7/2004 | Cachin | |
| 2010/0037055 A1* | 2/2010 | Fazio | H04L 9/3218 713/171 |

OTHER PUBLICATIONS

Harn, Lein, and Changlu Lin. "Strong (n, t, n) verifiable secret sharing scheme." Information Sciences 180.16 (2010): 3059-3064.*
Elwyn Berlekamp, Algebraic Coding Theory, Aegean Park Press, 1984, Chapter 7, pp. 176-199.
Michael Ben-Or, Ran Canetti, and Oded Goldreich, Asynchronous Secure Computation, STOC 1993, pp. 52-61.
Christian Cachin , Klaus Kursawe , Anna Lysyanskaya , Reto Strobl, Asynchronous Verifiable Secret Sharing and Proactive Cryptosystems, ACM CCS 2009, pp. 88-97.
Ashish Choudhury, Martin Hirt, Arpita Patra, Unconditionally Secure Asynchronous Multiparty Computation with Linear Communication Complexity, http://eprint.iacr.org/2012/517, (2012), pp. 0-34.
Ivan Damgard and Jesper Buus Nielsen, Scalable and Unconditionally Secure Multiparty Computation, CRYPTO 2007, pp. 572-590.
Adi Shamir, How to Share a Secret, Communications of the ACM 22(11): pp. 612-613, 1979.
Zuzana Beerliová-Trubiniová, Martin Hirt: Simple and Efficient Perfectly-Secure Asynchronous MPC. ASIACRYPT 2007, pp. 376-392.
Alfred V. Aho, John E. Hoperoft, and J. D. Ullman. The Design and Analysis of Computer Agorithms. Addison-Wesley, pp. 299-300, 1974.
Elwyn R. Berlekamp. Algebraic Coding Theory. Aegean Park Press,Chapter 7, 1984.
Michael Ben-Or, Shan Goldwasser, and Avi Wigderson. Completeness theorems for non-cryptographic fault-toerant distributed computation (extended abstract). In STOC, pp. 1-10, 1988.
Gabriel Bracha. An O(log n) expected rounds randomized byzantine generals protocol. J. ACM, 34(4):910-920, 1987.
Zuzana Beerliova-Trubiniova and Martin Hirt. Perfectly-secure mpc with linear corny unication complexity. InTCC, pp. 213-230, 2008.
Christian Cachin, Klaus Kursawe, Anna Lysyanskaya, and Reto Strobl. Asynchronous verifiable secret sharing and proactive cryptosysterns. In ACM Conference on Computer and Communications Security, pp. 88-97, 2002.
Ivan Damgard, Yuval Ishai, Mikkel Kroigaard, Jesper Buus Nielsen, and Adam Smith. Scalable multiparty computation with nearly optimal work and resilience. In CRYPTO, pp. 241-261, 2008.
Ivan Damgard, Yuval Ishai, and Mikkel Kroigaard, Perfectly secure multiparty computation and the computational overhead of cryptography. In EUROCRYPT, pp. 445-465, 2010.
Yvo Desmedt and Sushil Jajodia. Redistributing secret shares to new access structures and its applications. Jul. 1997. Technical Report ISSE TR-97-01, George Mason University.
Ivan Damgard and Jesper Buus Nielsen. Scalable and unconditionally secure multiparty computation. In CRYPTO, pp. 572-590, 2007.
Michael J. Fischer and Nancy A. Lynch. A lower bound for the time to assure interactive consistency. Inf. Process. Lett., 14(4):183-186, 1982.
Matthew K. Franklin and Moti Yung. Communication complexity of secure computation (extended abstract), In STOC, pp. 699-710, 1992.

Shuhong Gao. A new algorithm for decoding reed-solomon codes. In Communications, Information and Network Security, Editors V.Bhargava, H.V.Poor, V Tarokh, and S.Yoon, pp. 55-68. Kluwer, 2002.
Juan A. Garay and Yoram Moses. Fully polynomial byzantine agrees agreement in t+1 rounds. In STOC, pp. 31-41, 1993.
Oded Goldreich. Foundations of Cryptography: vol. 2, Basic Applications. Cambridge University Press, Chapter 7. 2009.
Amir Herzberg, Stanislaw Jarecki, Hugo Krawczyk, and Moti Yung. Proactive secret sharing or: How to cope with perpetual leakage. In CRYPTO, pp. 339-352. 1995.
David Schultz. Mobile Proactive Secret Sharing, PhD thesis, Massachusetts Institute of Technology. 2007.
Theodore M Wong, Chenxi Wang, and Jeannette M. Wing. Verifiable secret redistribution for archive system. In IEEE Security in Storage Workshop, pp. 94-106, 2002.
Lidong Zhou, Fred B. Schneider, and Robbed van Renesse. Apss; proactive secret sharing in asynchronous systems. ACM Trans. Inf. Syst. Secur., 8(3):259-286, 2005.
Eli Ben-Sasson, Serge Fehr, and Rafaii Ostrovsky. Near-linear unconditionally-secure multiparty computation with a dishonest minority. Cryptology ePrint Archive, Report 2011/629, 2011.
Zuzana Beerliova-Trubiniova and Martin Hirt. Efficient multi-party computation with dispute control. In TCC, pp. 305-328, 2006.
Ivan Damg_ard and Jasper Buus Nielsen. Scalable and unconditionally secure multiparty computation. In CRYPTO, pp. 572-690, 2007.
Rafail Ostrovsky and Moti Yung. How to withstand mobile virus attacks. In In Proceedings of the tenth annual ACM symposium on Principles of distributed computing, pp. 51-59. ACM Press, 1991.
Torben P. Pedersen. Non-interactive and information-theoretic secure verifiable secret sharing. In Joan Feigenbaum, editor, CRYPTO, vol. 576 of Lecture Notes in Computer Science, pp. 129-140. Springer, 1991.
David Schultz. Mobile Proactive Secret Sharing. PhD thesis, Massachusetts Institute of Technology. 2007.
Adi Shamir. How to share a secret. Commun. ACM, 22(11):612-613, 1979.
Alfred V. Aho, John E. Hopcroft, and J. D. Ullman. The Design and Analysis of Computer Algorithms. Addison-Wesley, pp. 299-300, 1974.
Elwyn R. Berlekarm. Algebraic Coding Theory. Aegean Park Press. Chapter 7, 1984.
Michael Ben-Or, Sha Goldwasser, and Avi Wigderson. Completeness theorems for non-cryptographic fault-tolerant distributed computation (extended abstract). In STOC, pp. 1-10, 1988.
Gabriel Bracha. An o(log n) expected rounds randomized randomized byzantine generals protocol. J. ACM, (4):910-920, 1987.
Eli Ben-Sasson, Serge Fehr, and Rafail Ostrovsky. Near-linear unconditionally-secure multiparty computation with a dishonest minority. Cryptology ePrint Archive, Report 2011/629, 2011.
Zuzana Beerfiova-Trubniova and Martin Hirt. Ecient multi-party computation with dispute control. In TCC, pp. 305-328, 2006.
Zuzana Beerfiova-Trubniova and Martin Hirt. Perfectly-secure mpc with linear communication complexity. In TCC, pp. 213{230, 2008.
Ivan Damgard, Yuval Ishai, Mikkel Krigaard, Jesper Buus Nielsen, and Adam Smith. Scalable multiparty computation with nearly optimal work and resilience. In CRYPTO, pp. 241-261, 2008.
Ivan Damg ard, Yuval lshai, and Mikkel Kr igaard. Perfectly secure multiparty computation and the computational overhead of cryptography. In EUROCRYPT, pp. 445-465, 2010.
Ivan Damg ard and Jesper Buus Nielsen. Scalable and unconditionally secure multiparty computation. In CRYPTO, pp. 572-590, 2007.
Shuhong Gao. A new algorithm for decoding reed-solomon codes. In Communications, Information and Network Security, V.Bhargava, H.V.Poor, V.Tarokh, and S.Yoon, pp. 55-68. Kluwer, 2002.
Juan A. Garay and Yoram Moses. Fully polynomial byzantine agreement in t+1 rounds. In STOC, pp. 31-41, 1993.
Amir Herzberg, Stanislaw Jarecki, Hugo Krawczyle, and Moti Yung. Proactive secret sharing or: How to cope with perpetual leakage. In CRYPTO, pp. 339-352. 1995.

(56) References Cited

OTHER PUBLICATIONS

Rafail Ostrovsky and Moti Yung. How to withstand mobile virus attacks (extended abstract). In PODC, pp. 51-59, 1991.
David Schultz. MobileProactive Secret Sharing. PhD thesis, Massachusetts Institute of Technology, 2007.
Adi Shamir. How to share a secret. Commun. ACM, 22(11):612. 613, 1979.
Joshua Baron and Karim El Defrawy and Joshua Lampkins and Rafail Ostrovsky, "How to Withstand Mobile Virus Attacks, Revisited," PODC '14, Proceedings of the 2014 ACM symposium on Principles of distributed computing, pp. 293-302.
Alfred V. Aho, John E. Hopcroft, and J. D. Ullman. The Design a Analysis of Computer Algorithms. Addison-Wesley, pp. 299-300, 1974.
Vaclav E. Benes. Optimal rearrangeable multistage connecting networks. The Bell System Technical Journal, 43 (4):1641-1656, Jul. 1964.
Elwyn R. Berlekamp. Algebraic Coding Theory. Aegean Park Press, 1984, Chapter 7.
Michael Ben-Or, Shafi Goldwasser, and Avi Wigderson. Completeness theorems for non-cryptographic fault-tolerant distributed computation (extended abstract). In STOC, pp. 1-10, 1988.
Gabriel Bracha. An O(log n) expected rounds randomized byzantine generals protocol. J. ACM, 34(4)910-920, 1987.
Zuzana Beerliova-Trubiniova and Martin Hirt. Perfectly-secure mpc with linear communication complexity. In TCC, pp. 213-230, 2008.
Ivan Damdard, Yuval Ishai, Mikkel Kroigaard, Jesper Buus Nielsen, and Adam Smith. Scalable multiparty computation with nearly optimal work and resilience. In CRYPTO, pp. 241-261, 2008.
Ivan Damgard, Yuval Ishai, and Mikkel Kroigaard. Perfectly secure multiparty computation and the computatational overhead of cryptography. In EUROCRYPT, pp. 445-465, 2010.
Michael J. Fischer and Nancy A. Lynch. A lower bound for the time to assure interractive consistency. Inf. Process. Lett., 14(4)183-186, 1982.
Matthew K. Franklin and Moti Yung. Communication complexity of secure computation (extended abstract). In STOC, pp. 699-710, 1992.
Shuhong Gao. A new algorithm for decoding reed-solomon codes. In Communications, Information and Network Security, Editors V.Bhargava, H.V.Poor, V.Tarokh, and S.Yoon, pp. 55-68. Kluwer, 2002.
Craig Gentry, Shai Halevi, and Nigel P. Smart. Fully homomorphic encryption with polylog overhead. In EURO-CRYPT, pp. 465-482, 2012.
Juan A. Garay and Yoram Moses. Fully polynomial byzantine agreement in t+1 rounds. In STOC. pp. 31-41, 1993.
Frank Thomson Leighton. Introduction to parallel algorithms and architectures: arrays, trees, hypercubes. Morgan Kaufmann, 1992, section 3.2.
Rafail Ostrovsky and Moti Yung. How withstand mobile virus attacks (extended abstract). In PODC, pp. 51-59, 1991.
Abraham Waksman. A permutation network. J. ACM, 15(1):159-163, 1968.
Office Action 1 for U.S. Appl. No. 14/449,115. Date mailed: Jul. 23, 2015.
Office Action 1 Response for U.S. Appl. No. 14/449,115. Date mailed. Oct. 23, 2015.
Office Action 2 for U.S. Appl. No. 14/449,115. Date mailed: Nov. 5, 2015.
Office Action 2 Response for U.S. Appl. No. 14/449,115. Date mailed: Feb. 5, 2016.
Office Action 3 for U.S. Appl. No. 14/449,115. Date mailed: Mar. 7, 2016.
Office Action 1 for U.S. Appl. No. 14/207,321. Date mailed: May 18, 2015,.
Office Action 1 Response for U.S. Appl. No. 14/207,321. Date mailed: Aug. 18, 2015.
Office Action 2 for U.S. Appl. No. 14/207,321. Date mailed: Dec. 14, 2015.
Office Action 2 Response for U.S. Appl. No. 14/207,321. Date mailed. Apr. 14, 2016.
Office Action 1 for U.S. Appl. No. 14/449,868 Date mailed: Aug. 13, 2015.
Bai, Li, and XuKai Zou, "A proactive secret sharing scheme in matrix projection method," Internaton Journal of Security and Networks 4.4 (2009), pp. 201-209.
Harn, Lein, and Changlu Lin, "Strong (n, t, n) verifiable secret sharing scheme," Information Sciences 180.16 (2010), pp. 3059-3064.
Office Action 1 Response for U.S. Appl. No. 14/449,868 Date mailed: Dec. 10, 2015.
Office Action 2 for U.S. Appl. No. 14/449,868. Date mailed: Jan. 29, 2016.
Office Action 1 for U.S. Appl. No. 14/207,483. Date mailed: May 22, 2015.
Office Action 1 Response for U.S. Appl. No. 14/207,483. Date mailed: Sep. 22, 2015.
Office Action 2 for U.S. Appl. No. 14/207,483. Date mailed: Nov. 2, 2015.
Office Action 2 Response for U.S. Appl. No. 14/207,483. Date mailed Apr. 4, 2016.
Office Action 1 for U.S. Appl. No. 14/054,655. Date mailed: Jan. 29, 2015.
R. Thorbek "Proactive Linear Integer Secret Sharing," In Proceedings of IACR Cryptology ePrint Archive 2009, pp. 183-198.
Office Action 1 Response for U.S. Appl. No. 14/054,655. Date mailed: Apr. 29, 2015.
Office Action 2 for U.S. Appl. No. 14/054,655. Date mailed: Jun. 17, 2015.
Office Action 2 Response for U.S. Appl. No. 14/054,655. Date mailed: Sep. 214, 2015.
Office Action 3 for U.S. Appl. No. 14/054,655. Date mailed: Oct. 23, 2015.
Office Action 3 Response for U.S. Appl. No. 14/054,655. Date mailed: Jan. 25, 2016.
Office Action 1 for U.S. Appl. No. 14/477,613. Date maiied: Oct. 8, 2015.
Office Action 1 Response for U.S. Appl. No. 14/477,613. Date mailed: Jan. 7, 2016.
Office Action 2 for U.S. Appl. No. 14/477,613. Date mailed: Feb. 26, 2016.
Alfred V. Aho, John E. Hopcroft, and J. D. Ullman. The Design and Analysis of Computer Algorithms. Addison-Wesley, 1974. pp. 299-300.
Christian Cachin, Klaus Kursawe, Anna Lysyanskaya, and Reto Strobl. Asynchronous verifiable secret sharing and proactive cryptosystems, In ACM Conference on Computer and Communications Security, pp. 88-97, 2002.
Ivan Damgard and Jesper Buus Nielsen. Scalable and unconditionally secure multiparty computation. In CRYPTO, pp. 572-690, 2007.
Amir Herzberg, Stanislaw Jarecki, Hugo Krawczyk, and Moti Yung. Proactive secret sharing or: How to cope with perpetual leakage. In CRYPTO, pp. 339-352, 1995.
Theodore M. Wong, Chenxi Wang, and Jeannette M. Wing. Verifiable secret redistribution for archive system. In IEEE Security in Storage Workshop, pp. 94-106, 2002.
Lidong Zhou, Fred B. Schneider, and Robbert van Renesse. Apss: proactive secret sharing in asynchronous systems. ACM Trans. Inf. Syst. Secur., 8(3):259-286, 2005.
Rafail Ostrovsky and Moti Yung. How to withstand mobile virus attacks (extended abstract). Principles of Distributed Computing (PODC), pp. 51-59, 1991.
Oded Goldreich. Foundations of Cryptography: Basic Tools. Section 1.3. Cambridge University Press. New York, NY, 2000.
Oded Goldreich. Foundations of Cryptography, vol. II: Basic Applications. Cambridge University Press. New York, NY, 2004.
Paul Feldman, A practical scheme for non-interactive verifiable secret sharing. IEEE Symposium on Foundations of Computer Science, pp. 427-437. IEEE, 1987.
Eli Ben-Sasson, Serge Fehr, and Rafail Ostrovsky. Near-linear unconditionally-secure mulfiparty computation with a dishonest minority. In CRYPTO, pp. 663-680, 2012.
Hertzberg et al., "Proactive Secret Sharing," Advances in Cryptology—CRYPT0'95, Lecture Notes in Computer Science vol. 963, 1995, pp. 339-352.

* cited by examiner

GENERIC PROACTIVELY-SECURE SECRET-SHARING PROTOCOL FROM ANY SUITABLE HONEST-MAJORITY SECRET-SHARING PROTOCOL

CROSS-REFERENCE TO RELATED APPLICATIONS

This is a Continuation-in-Part application of U.S. Non-Provisional Application No. 14/054,655, filed in the United States on Oct. 15, 2013, entitled, "General Protocol for Proactively Secure Computation", which is a Non-Provisional patent application of U.S. Provisional Application No. 61/780,795, filed in the United States on Mar. 13, 2013, entitled, "General Protocol for Proactively Secure Computation." U.S. Non-Provisional Application No. 14/054,655 is also a Non -Provisional patent application of U.S. Provisional Application No. 61/780,638, filed in the United States on Mar. 13, 2013, entitled, "Efficient Protocol for Mobile Proactive Secret Sharing." U.S. Non-Provisional Application No. 14/054,655 is also a Non-Provisional patent application of U.S. Provisional Application No. 61/780,757, filed in the United States on Mar. 13, 2013, entitled, "Efficient Protocol for Mobile Proactive Secure Multiparty Computation (MPMPC) Using Commitments," all of which are incorporated herein by reference in their entirety.

This is ALSO a Continuation-in-Part application of U.S. Non-Provisional Application No. 14/449,868, filed in the United States on Aug. 1, 2014, entitled, "An Information Secure Proactive Multiparty Computation (PMPC) Protocol with Linear Bandwidth Complexity", which is a Continuation-in-Part application of U.S. Non-Provisional Application No. 14/207,483, filed in the United States on Mar. 12, 2014, entitled, "System and Method for Mobile Proactive Secure Multi-Party Computation (MPMPC) Using Commitments." U.S. Non-Provisional Application No. 14/207,483 is a Non-Provisional patent application of U.S. Provisional Application No 61/780,757, filed in the United States on Mar. 13, 2013, entitled, "An Efficient Protocol for Mobile Proactive Secure Multiparty Computation (MPMPC) Using Commitments." U.S. Non -Provisional Application No. 14/449,868 is a Non-Provisional patent application of U.S. Provisional Application No. 61/861,334, filed in the United States on Aug. 1, 2013, entitled, "An Information Theoretically Secure Proactive Multiparty Computation (PMPC) Protocol with Linear Bandwidth Complexity." U.S. Non -Provisional Application No. 14/449,868 is ALSO a Non-Provisional patent application of U.S. Provisional Application No. 61/861,325, filed in the United States on Aug. 1, 2013, entitled, "An Information Theoretically Secure Protocol for Mobile Proactive Secret Sharing with Near-Optimal Resilience," all of which are incorporated herein by reference in their entirety.

This is ALSO a Continuation-in-Part application of U.S. Non-Provisional Application No. 14/477,613, filed in the United States on Sep. 4, 2014, entitled, "A Secure Mobile Proactive Multiparty Computation Protocol", which is a Continuation-in-Part application of U.S. Non-Provisional Application No. 14/207,483, filed in the United States on Mar. 12, 2014, entitled, "System and Method for Mobile Proactive Secure Multi-Party Computation (MPMPC) Using Commitments," which is a Non-Provisional patent application of U.S. Provisional Application No. 61/780,757, filed in the United States on Mar. 13, 2013, entitled, "An Efficient Protocol for Mobile Proactive Secure Multiparty Computation (MPMPC) Using Commitments." U.S. Non-Provisional Application No. 14/477,613 is a Continuation-in-Part application of U.S. Non -Provisional Application No. 14/449,868, filed in the United States on Aug. 1, 2014 entitled, "An Information Secure Proactive Multiparty Computation (PMPC) Protocol with Linear Bandwidth Complexity," which is a Non -Provisional patent application of U.S. Provisional Application No. 61/861,334, filed in the United States on Aug. 1, 2013, entitled, "An Information Theoretically Secure Proactive Multiparty Computation (PMPC) Protocol with Linear Bandwidth Complexity." U.S. Non-Provisional Application No. 14/449,868 is a Continuation-in-Part application of U.S. Non-Provisional Application No. 14/207,483, filed in the United States on Mar. 12, 2014, entitled, "System and Method for Mobile Proactive Secure Multi-Party Computation (MPMPC) Using Commitments," which is a Non-Provisional patent application of U.S. Provisional Application No. 61/780,757, filed in the United States on Mar. 13 , 2013, entitled, "An Efficient Protocol for Mobile Proactive Secure Multiparty Computation (MPMPC) Using Commitments." U.S. Non-Provisional Application No. 14/449,868 is AlSO a Non-Provisional patent application of U.S. Provisional Application No. 61/861,325, filed in the United States on Aug. 1, 2013, entitled, "An Information Theoretically Secure Protocol for Mobile Proactive Secret Sharing with Near-Optimal Resilience." U.S. Non-Provisional Application No. 14/477,613 is ALSO a Continuation-in-Part application of U.S. Non-Provisional Application No. 14/449,115, filed in the United States on Jul. 31, 2014, entitled "An Information Secure Protocol for Mobile Proactive Secret Sharing with Near-Optimal Resilience," which is a Non-Provisional patent application of U.S. Provisional Application No. 61/861,325, filed in the United States on Aug. 1, 2013, entitled, "An information Theoretically Secure Protocol for Mobile Proactive Secret Sharing with Near-Optimal Resilience." U.S. Non-Provisional Application No. 14/449,115 is ALSO a Continuation-in-Part application of U.S. Non-Provisional Application No. 14/207,321, filed in the United States on Mar. 12, 2014, entitled, "System and Method for Mobile Proactive Secret Sharing," which is a Non-Provisional patent application of U.S. Provisional Application No. 61/780,638, filed in the United States on Mar. 13, 2013, entitled, "An Efficient Protocol for Mobile Proactive Secret Sharing," all of which are incorporated herein by reference in their entirety.

This is ALSO a Non-Provisional application of U.S. Non-Provisional Application No. 62/032,338, filed in the United States on Aug. 1, 2014, entitled, "A Generic Proactively-Secure Secret-Sharing Protocol from Any Suitable Honest-Majority Secret-Sharing Protocol," which is incorporated herein by reference in its entirety.

BACKGROUND OF INVENTION (1) Field of Invention

The present invention relates to a system for constructing a proactively secure secret sharing (PSS) protocol from a non-proactively secure secret sharing protocol and, more particularly, to a system for constructing a PSS protocol from a generic non-proactively secure secret sharing protocol.

(2) Description of Related Art

A proactively secure secret sharing (PSS) protocol is one that is secure under the proactive security model. PSS protocols allow data to be securely distributed among a group of servers (also referred to as players or parties in the cryptographic literature) in such a way that confidentiality and integrity are guaranteed as long as an adversary compromises no more than a fixed fraction of the servers in a certain period of time, called the refresh period. This remains true even if the adversary is allowed to eventually compromise all the servers; the main requirement is that no more than a fixed fraction is compromised during any given stage (i.e., time between two subsequent refreshes) of the operation of the PSS protocol.

The construction of a PSS protocol using a SHARE protocol would be advantageous. Literature Reference No. 4 (see the List of Incorporated Literature References) describes proactive SHARE refreshing, but does not have a construction from generic SHARE protocols. In particular, Literature Reference No. 4 is only cryptographically secure in the asynchronous model. Information theoretically secure protocols are more desirable, because they do not rely on the hardness of computational assumptions so there is no threat of such assumptions being rendered insecure due to advances or breakthroughs in the state of knowledge in computer science and other related fields. Heuristically, information theoretically secure protocols are also more efficient than cryptographically secure protocols.

Thus, a continuing need exists for construction of a PSS protocol from any generic non-proactively secret sharing protocol that can be information theoretically secure.

SUMMARY OF THE INVENTION

The present invention relates to a system for constructing a proactively secure secret sharing (PSS) protocol from a non-proactively secure secret sharing protocol and more particularly, to a system for constructing a PSS protocol from a generic non-proactively secure secret sharing protocol. The system comprises one or more processors and a memory having instructions such that when the instructions are executed, the one or more processors perform multiple operations. The system transforms a SHARE protocol into a proactively secure secret sharing (PSS) protocol. A PRE-FRESH protocol is performed that includes execution of the SHARE protocol. The PREFRESH protocol refreshes shares of secret data among a plurality of parties. The SHARE protocol is a non-proactively secure secret sharing protocol.

In another aspect, the SHARE protocol has a value t less than n/3, where t denotes a corruption threshold, and n denotes a number of parties in the plurality of parties.

In another aspect, the PSS protocol is initialized to securely store the secret data among the plurality of parties, wherein security is guaranteed in the presence of an adversary having a set of properties that are equivalent to those of an adversary of the SHARE protocol.

In another aspect, security of the PREFRESH protocol is the same as security of the SHARE protocol.

In another aspect, the PSS protocol is information secure in an asynchronous network model.

In another aspect, the PREFRESH protocol is combined with the SHARE protocol by executing the SHARE protocol and periodically executing the PREFRESH protocol.

In another aspect, $s^{(k)}$ is a $k^{th}$ secret, where each party $P_j$ has a share $-s_j^{(k)}$, and after an execution of the PREFRESH protocol, each party will obtain a new share $s_j^{(k)}$ that correctly interpolates to $s^{(k)}$ and is distributed independently from $-s_j^{(k)}$.

In another aspect, an adversary who obtains $-s_j^{(k)}$ cannot predict the new share $s_j^{(k)}$ provided that $P_j$ is not corrupted during the PREFRESH protocol.

Another aspect includes a method for causing a processor to perform the operations described herein.

Finally, yet another aspect comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of various aspects in conjunction with reference to the following drawings, where.

DETAILED DESCRIPTION

The present invention relates to a system for constructing a proactively secure secret sharing (PSS) protocol from a non-proactively secure secret sharing protocol and, more particularly, to a system for constructing a PSS protocol from a generic non-proactively secure secret sharing protocol. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to those specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Following that is an introduction that provides an overview of the present invention. Finally, specific details of the present invention are provided to give an understanding of the specific aspects.

(1) List of Incorporated Literature References

The following references are incorporated and cited throughout this application. For clarity and convenience, the references are listed herein as a central resource for the reader. The following references are hereby incorporated by reference as though fully included herein. The references are cited in the application by referring to the corresponding literature reference number, as follows:

1. Elwyn Berlekamp. Algebraic Coding Theory. Chapter 7, Aegean Park Press, 1984.
2. Michael Ben-Or, Ran Canetti, and Oded Goldreich, Asynchronous Secure Computation, STOC Proceedings of the Twenty-Fifth Annual ACM Symposium on Theory of Computing, pages 52-61, 1993.
3. Zuzana Beerliová-Trubiniová, Martin Hirt: Simple and Efficient Perfectly-Secure Asynchronous MPC. Advances in Cryptology-ASIACRYPT 2007, Lecture Notes in Computer Science, Volume 4833, pages 376-392, 2007.
4. Christian Cachin, Klaus Kursawe, Anna Lysyanskaya, Reto Strobl, Asynchronous Verifiable Secret Sharing and Proactive Cryptosystems, Proceedings of the $9^{th}$ ACM Conference on Computer and Communications Security, pages 88-97, 2002.
5. Ashish Choudhury, Martin Hirt, Arpita Patra, Unconditionally Secure Asynchronous Multiparty Computation with Linear Communication Complexity, preprint.
6. Ivan Damgard and Jesper Buus Nielsen. Scalable and unconditionally secure multiparty computation. In CRYPTO, pages 572-590, 2007.
7. Adi Shamir, *How to SHARE a Secret,* Communications of the ACM 22(11):612-613, 1979.

(2) Principal Aspects

The present invention has three "principal" aspects. The first is a system for constructing a proactively secure secret sharing (PSS) protocol from a generic non-proactively secure secret sharing protocol. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
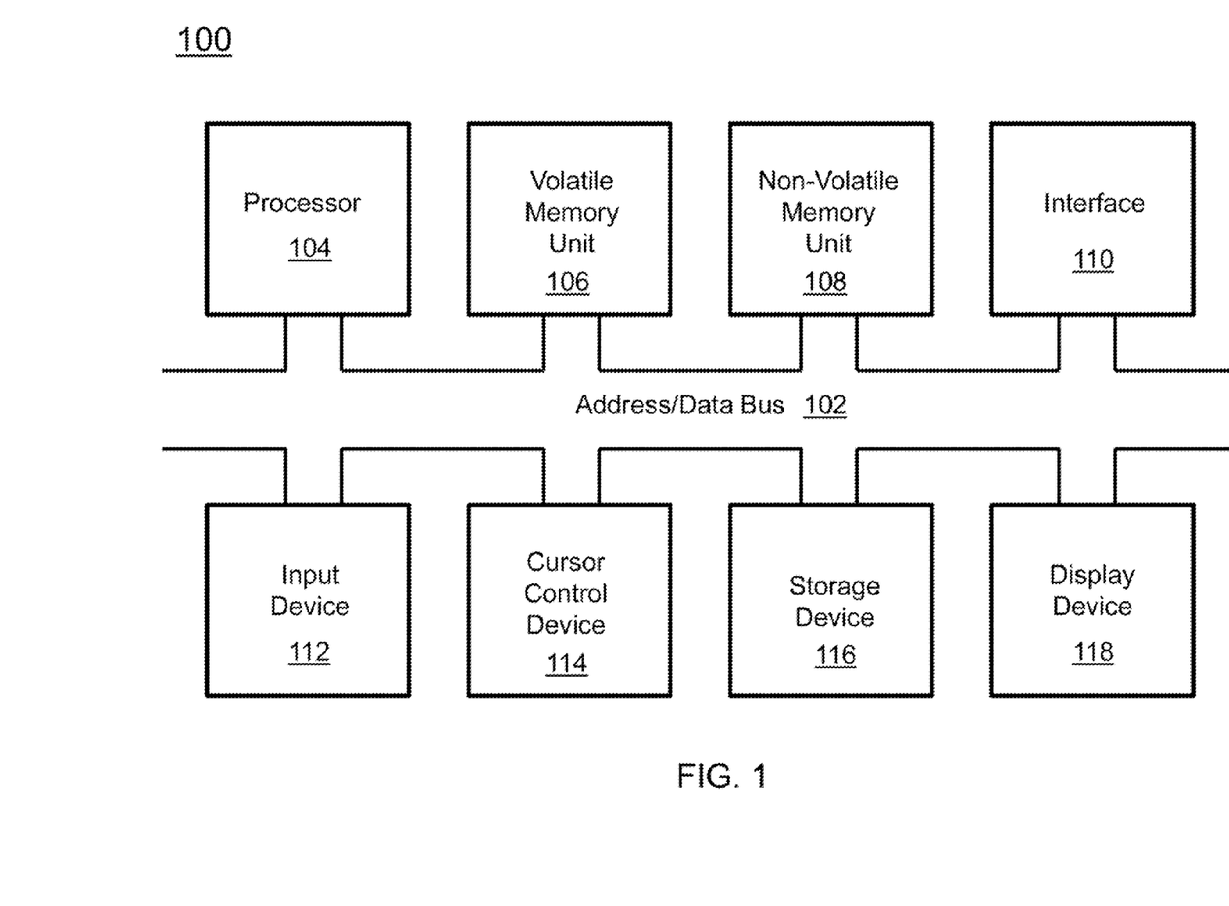
FIG. 1 is a block diagram depicting the components of a system for constructing a proactively secure secret sharing (PSS) protocol from a generic non-proactively secure secret sharing protocol according to various embodiments.

A block diagram depicting an example of a system (i.e., computer system 100) according to an embodiment is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
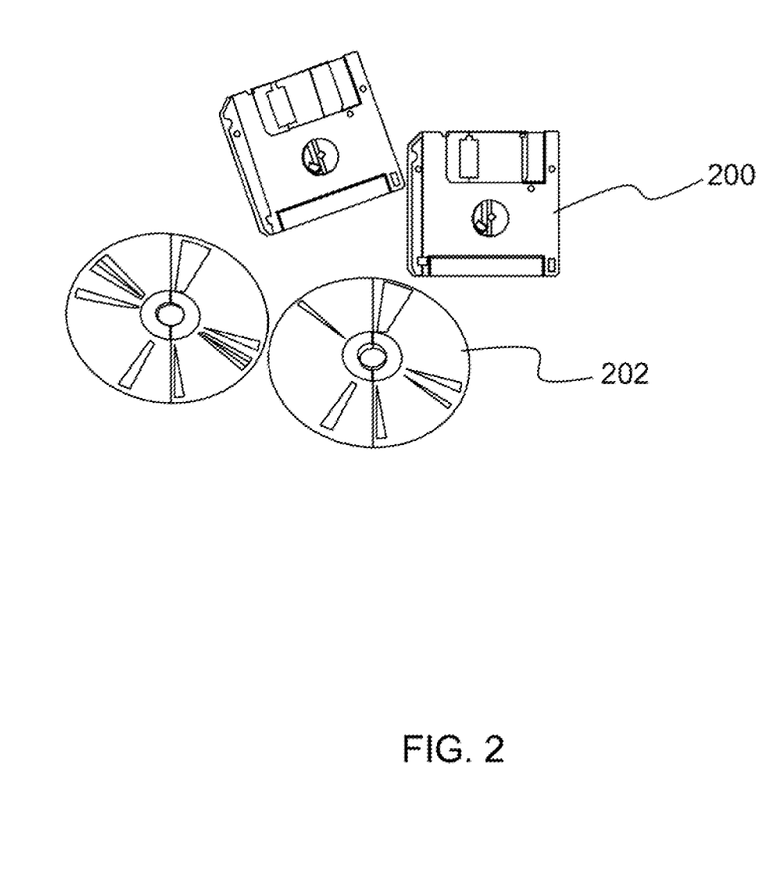
FIG. 2 is an illustration of a computer program product according to various embodiments.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Described is a system (typically called a compiler in cryptographic and computer science literature) to convert a secret sharing (SS) protocol with certain requirements into a proactively secure secret sharing (PSS) protocol (i.e., one that is secure under the proactive security model). PSS protocols allow data to be securely distributed among a group of servers (servers are also called players or parties in the cryptographic literature) in such a way that confidentiality and integrity of data is guaranteed as long as an adversary compromises no more than a fixed fraction of the servers in a certain period of time (called the refresh period). This remains true even if the adversary is allowed to eventually compromise all the servers; the main requirement is that no more than a fixed fraction is compromised during any given stage (time between two subsequent refreshes) of the operation of the PSS protocol.

The system according to various embodiments constructs a PSS protocol by using any appropriate non-proactively secure secret sharing protocol, denoted a SHARE protocol, to construct a corresponding proactive SHARE refreshing PREFRESH protocol, that, together with the SHARE protocol, comprises a PSS protocol. The new PSS protocol has the same security requirements as the SHARE protocol (e.g., unconditionally versus cryptographic security guarantees, resilience to adaptive versus static corruptions, and suitability for asynchronous versus synchronous networks) provided that the corruption threshold of the SHARE protocol per refresh period is at most ⅓ of the total number of servers. The asymptotic costs in computation and communication of the PREFRESH protocol is approximately n times the cost of the SHARE protocol, where n is the number of servers, with an additional additive poly(n) cost. The asynchronous network model is one where, unlike in the synchronous network model, servers do not have a common clock, and instantaneous message delivery is not assumed.

(4) Specific Details of the Invention

Described is a compiler to transform a secret-sharing protocol, denoted a SHARE protocol, into a proactively secure secret-sharing protocol by constructing a PREFRESH protocol, which is a proactive SHARE refresh protocol using the SHARE protocol as an underlying sub-protocol. More specifically, let P be the set of parties participating in the computation, where the size of P is n (i.e., $|P|=n$). Let t be the per-stage corruption threshold, which is the number of parties that can be corrupted at any one stage. A stage is defined as the period between two PREFRESH protocol operations. The adversary for the PREFRESH protocol has the same properties as the adversary for the SHARE protocol, which includes computational strength, distinguishing probability, and per-stage corruption threshold.

In various embodiments of the present invention, the SHARE protocol has a value t less than n/3. More precisely, if the SHARE protocol can be executed with $t \geq n/3$, the compiler will output a protocol with a new overall threshold $t' < n/3$. Proactive security proceeds in alternating computation and refreshing phases. In the computation phase, parties can perform arbitrary computations (described as linear operations) on their data, stored as secret shares. In the refreshing phase, the secret shares are refreshed in such a way that they still correspond to the same secret, but are independently distributed as shares from previous shares of the same secret, rendering them unusable for any adversary who has learned the secret shares in previous phases. A stage consists of consecutive refreshing -computation-refreshing phases, which is to say that any party corrupted during the refreshing phase is considered to be corrupted in the two stages which that refreshing phase belongs to. The security assumption is that an adversary may corrupt no more than t parties per stage.

Figure 3:
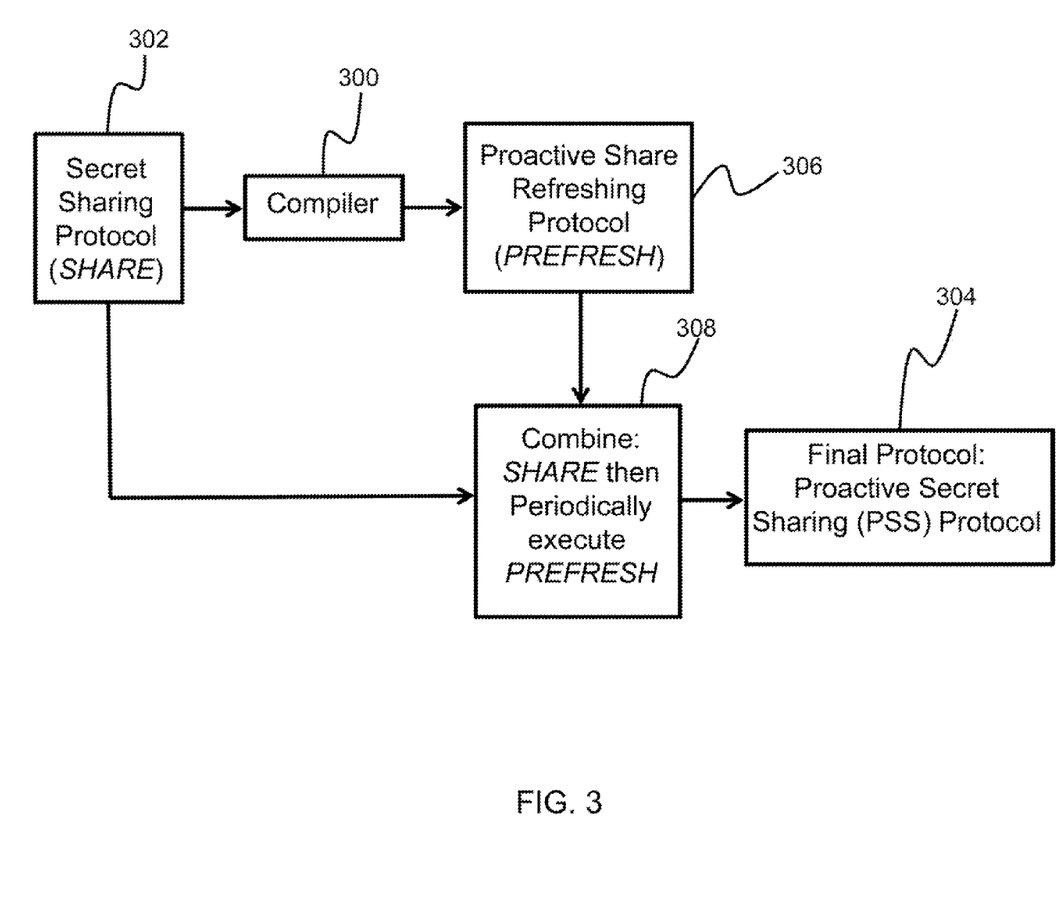
FIG. 3 is an illustration of a system for constructing a PSS from a SHARE protocol according to various embodiments.

FIG. 3 depicts the system according to various embodiments. As described above a compiler 300 transforms a SHARE protocol 302 to a PSS protocol 304 by constructing a PREFRESH protocol 306 and combining 308 the SHARE protocol 302 with the PREFRESH protocol 306.

In an embodiment, the following are assumptions in the SHARE protocol. The first assumption is that secret sharing is based on Shamir secret-sharing (see Literature Reference No. 7 for a description of Shamir secret-sharing) (or Shamir-like secret sharing), where a secret s to be shared is stored as the free term in, for example, $s=f(0)$, a degree $t-1$ polynomial $f(x)$, where each coefficient is over the field of q elements, where q is a prime number. The party distributing s is referred to as the dealer. The share of each party $P_i$ is the element $f(i)$, or more generally $f(c_i)$ for some publicly known $c_i$. However, the details of how each party obtains their share is determined by the SHARE protocol; some protocols may use univariate polynomials, some may use bivariate or multivariate polynomials. The key may be that the output of the protocol is a single value $f(i)$ for the ith party at the output of the protocol SHARE dissemination phase.

The second assumption is that secret s can be recovered by each party obtaining sufficiently many (e.g., at least t) of the other parties' shares and applying a polynomial interpolation method. One instantiation is for parties to use the Berlekamp-Welch algorithm (see Literature Reference No. 1 for a description of the Berlekamp-Welch algorithm). In particular, this algorithm allows for up to ⅓ of shares to be incorrect, and yet still correctly interpolate the required polynomial. Therefore, to obtain s, parties can interpolate shares to obtain the polynomial $f(x)$, and evaluate $f(0)$ to obtain s.

The third assumption is that there is a requirement that the SHARE protocol be correct in the sense that as long as the threshold t is not violated, all parties receive correct shares of some distributed secret. However, the compiler does not require proof that the shares correspond to the secret as called for as part of a larger protocol. In practice, this means that honest parties will always receive shares of the secret an honest dealer intended to distribute, and of some secret when the dealer is not honest. In the asynchronous network model, this also implies that honest parties will eventually receive correct shares from honest dealers (though perhaps, except with some small probability, as allowed for in the adversary model).

The proactive security model assumes that parties have the ability to securely delete inputs, and that parties have access to a secured cryptographic module that cannot be corrupted and that has the ability to generate randomness and perform whatever other cryptographic tasks that the SHARE protocol requires (e.g., encryption and signatures) such that corruption of the party reveals no state information of the cryptographic module, such as any key material. One instantiation of such a module can be as a Trusted Platform Module (TPM). Without loss of generality, various embodiments assume perfectly secure authenticated point-to-point channels, but such requirements can be relaxed (point-to-point channels can be only cryptographically secure, subject to adversary strength).

Examples of secret sharing protocols that satisfy the above requirements can be found in Literature Reference Nos. 4, 5, and 6. The SHARE protocol may include techniques for aggregating secrets (e.g., for sharing l secrets with communication cost sublinear in l). Provided that each of the l secrets corresponds to a distinct polynomial, where the polynomial encodes a secret as the $0^{th}$ coefficient, the PREFRESH protocol can be amortized in the same manner that the SHARE protocol is.

(4.1) Compiler (4.1.1) Preliminaries

Define $\lambda_{ij}$ as the $ij^{th}$ Lagrange coefficient, where $\lambda_{ij}=\Pi_{1 \leq m \leq d, m \neq i}[(j-m)/(i-m)]$. For a polynomial $g(x)$ of degree d, it is the case that $g(k)=\Sigma_{1 \leq i \leq d}\lambda_{ik}g(i)$. The compiler will require Lagrange coefficients for specific subsets of P. Without loss of generality, assume these parties are consecutively numbered starting at 1. Further, Lagrange coefficients here are described when parties have share $f(i)$; when their shares are evaluation points at fixed values (e.g., $C_j$), the description above must replace j by $C_j$, etc.

The following is a description of how to compile the SHARE protocol into the PREFRESH protocol. The section describes the construction of the PREFRESH protocol, the proactive refresh subprotocol of the final PSS protocol. Let $s^{(k)}$ be the $k^{th}$ secret, where each party $P_j$ has share $-s_j^{(k)}$. Note that up to t parties may have incorrect shares because they may be corrupt. What the PREFRESH protocol accomplishes is that each honest party, at the end of the execution of the PREFRESH protocol will obtain a new share $s_j^{(k)}$ that correctly interpolates to $s^{(k)}$ and, furthermore, is distributed independently from $-s_j^{(k)}$. Therefore, an adversary who obtains $-s_j^{(k)}$ cannot predict the value $s_j^{(k)}$ if $P_j$ is not corrupted during the PREFRESH protocol.

(4.1.2) PREFRESH Protocol (using the SHARE protocol)

As input to the protocol, there are L secrets $\{s^{(k)}\}_{k=1}^L$, shared with polynomials $\{\alpha^{(k)}\}_{k=1}^L$ such that $\alpha^{(k)}(0)=s^{(k)}$. Each (honest) party $P_j$ holds a share $\alpha^{(k)}(j)$ of each $\alpha^{(k)}$.

1. Each party $P_j$ executes the SHARE protocol L+1 times as dealer, sharing random values. The polynomials generated by $P_j$ are denoted $\beta_j(x)$ and $\gamma_j^{(k)}(x)$ for $k=1, \ldots, L$.

2. The players locally add their shares to compute their share of $\beta(x)=\Sigma_{j=1}^n\beta_j(x)$, and they similarly construct $\gamma^{(k)}(x)=\Sigma_{j=1}^n\gamma_j^{(k)}(x)$.

3. For each $k=1, \ldots, L$, each party $P_j$ constructs the degree t polynomial $a_j^{(k)}(x)$ such that $a_j^{(k)}(0)=\alpha^{(k)}(j)$ and, otherwise, has randomly chosen coefficients. Similarly, $P_j$ constructs the degree t polynomial $b_j(x)$ such that $b_j(0)=\beta(j)$ and, otherwise, has randomly chosen coefficients.

4. For each $k=1, \ldots, L$, each party $P_j$ executes the SHARE protocol as dealer with secret $\alpha^{(k)}(j)$ using polynomial $a_j^{(k)}(x)$, deleting $\alpha^{(k)}(j)$ afterwards. Similarly, $P_j$ executes the SHARE protocol as dealer with secret $\beta(j)$ using $b_j(x)$.

5. Each party $P_j$ sends $\gamma^{(k)}(j)$ to each party for each $k=1, \ldots, L$.

6. Each party $P_j$, upon receipt of at least $3t+1$ of the shares of $\gamma^{(k)}(x)$, interpolates them using Berlekamp-Welch to obtain $\gamma^{(k)}(0)=G^{(k)}$.

7. Each party $P_j$ sends $b_i(j)+\Sigma_{k=1}^L G^{(k)}a_i^{(k)}(j)$ to each party for each $i=1, \ldots, n$.

8. Each party $P_j$, upon receipt of at least $3t+1$ of the shares of $b_i(x)+\Sigma_{k=1}^L G^{(k)}a_i^{(k)}(x)$, interpolates them using Berlekamp-Welch to obtain $b_i(0)+\Sigma_{k=1}^L G^{(k)}a_i^{(k)}(0)=\beta(i)+\Sigma_{k=1}^L G^{(k)}\alpha^{(k)}(i)$ for each $i=1, \ldots, n$.

9. Each party $P_j$, upon interpolating at least $3t+1$ points on $\beta(x)+\Sigma_{k=1}^L G^{(k)}(x)$, interpolates these points using Berlekamp-Welch in order to find out which points on this polynomial are correct; this determines which of the sharings generated in step 4 were sharings of the correct values.

10. In the asynchronous network case, a special case of Byzantine agreement, Agreement on a Core Set (ACS) (see Literature Reference No. 2 for a description of ACS), is invoked to decide on a common set S of the corresponding t parties who shared the correct values in step 4. All the sharings $\{a_i^{(k)}(x)\}_{i \in S}$ are deemed to be correct (except with negligible probability).

11. The parties interpolate the polynomials $\{\alpha_i^{(k)}(x)\}_{i \in S}$ that were deemed correct in the previous step to construct a new polynomial $\alpha^{(k)}(x) = \Sum_{i \in S} \lambda_{0i} \alpha_i^{(k)}(x)$. This shares the same secret as $\alpha^{(k)}(x)$ did, since $\alpha^{(k)}(0) = \Sum_{i \in S} \lambda_{0i} \alpha_i^{(k)}(0) = \Sum_{i \in S} \lambda_{0i} \alpha^{(k)}(i) = \alpha^{(k)}(0)$.

The communication complexity of the PREFRESH protocol is $O((L+1)n\text{Comm}(\text{SHARE}) + Ln^2 + n^3)$, plus an additive term of $O(n^4 \log n)$ in the asynchronous case to perform ACS. Here, Comm(SHARE) is the communication complexity of the SHARE protocol.

For asynchronous network settings, when the PREFRESH protocol is constructed for the SHARE protocol in the asynchronous multi-party computation (MPC) protocol described in Literature Reference No. 3, various embodiments may be used to construct a proactively secure MPC protocol in the asynchronous network model with communication complexity $O(Cn^4 k + D\,\text{poly}(n,k) + \text{poly}(n,k))$, where C is the circuit size, n is the number of parties, D is the depth of the circuit, and k is the security parameter. Namely, the computation phases consist of each of the depth-wise computation phases of the circuit computation outlined in Literature Reference No. 3. The refreshing phases occur in between each of the depth-wise computation phases. The other change is that randomness generation, outlined as a pre-processing step before the circuit computation in Literature Reference No. 3, must instead be computed within a constant number of computation phases from when it is used. Because O(n) random elements are used for each multiplication gate in the Literature Reference No. 3 protocol, such a shift will not increase the asymptotic complexity b a multiplicative factor on the circuit size, but will increase the complexity with respect to the depth of the circuit, since computationally expensive calls to ACS must be made at every refreshing phase, which explains the $O(D\,\text{poly}(n,k))$ term above.

There are many applications for various embodiments. For instance, the system according to various embodiments can be used to construct protocols to store data (such as sensitive security data (e.g., certificates and cryptographic keys)) in a distributed fashion across nearby vehicles or in a cloud infrastructure. For example, even if up to 30% of vehicles are corrupted at any one time, confidentiality and integrity of data is still maintained. The group of vehicles participating in the storage can change over time.

The invention described herein can also be utilized to store data in a distributed fashion across unmanned aerial vehicles (UAVs), soldiers, and other platforms, or in other distributed infrastructure connected through lossy and delay-tolerant networks. For instance, a group of soldiers can maintain highly sensitive data (such as encryption keys and identifying information) distributed across mobile devices (or other communication devices) that each solider possesses. Data confidentiality and integrity is maintained as long as less than 30% of soldiers are compromised.

Furthermore, various embodiments can be used as a means of securing personal data on mobile devices. For instance, certain smart phone or tablet applications store sensitive personal information. The system according to various embodiments can secure this data by dynamically spreading it among several devices in an area or over the Internet. As long as less than 30% of the cell phones are compromised, data security and integrity is maintained.

In general, described is a system for constructing a protocol that can be used to store data in a distributed fashion, by secret sharing it, while guaranteeing its confidentiality and integrity against powerful adversaries for a long period of time by periodically refreshing it so that any leaked portions of the secret shared data can't be used in the future to recover the data. The network connecting the parties involved in storing the data can be lossy and suffer from delays and this would not affect the security (confidentiality and integrity) guarantees provided by the protocol. This is very useful in settings where parties use the Internet (or mobile networks) to communicate (i.e., parties are not on the same local area network). Even if parties are on the same local area network, using this protocol will provide robustness to any unexpected delays or failures due to misconfigurations of deliberate malicious attempts.

What is claimed is:

1. A system for implementing a proactively secure secret sharing (PSS) protocol, the system comprising:
   one or more processors and a non-transitory computer-readable medium having executable instructions encoded thereon such that when executed, the one or more processors perform operations of:
   transforming a SHARE protocol into a proactively secure secret sharing (PSS) protocol by performing a PREFRESH protocol that includes execution of the SHARE protocol,
   wherein the PREFRESH protocol refreshes shares of secret data among a plurality of parties of a distributed infrastructure connected through a network,
   wherein the SHARE protocol is a non-proactively secure secret sharing protocol, and
   wherein the PSS protocol is used to store data in a distributed fashion across the plurality of parties such that the PSS protocol provides security of the stored data despite unexpected network delays and failures due to malicious attacks on the network by an adversary.

2. The system as set forth in claim 1, wherein the SHARE protocol has a value t less than n/3, where t denotes a corruption threshold, and n denotes a number of parties in the plurality of parties.

3. The system as set forth in claim 1, wherein the one or more processors further perform an operation of initializing the PSS protocol to securely store the secret data among the plurality of parties, wherein security is guaranteed in the presence of an adversary having a set of properties that are equivalent to those of an adversary of the SHARE protocol.

4. The system as set forth in claim 3, wherein security of the PREFRESH protocol is the same as security of the SHARE protocol.

5. The system as set forth in claim 4, wherein the PSS protocol is information secure in an asynchronous network model.

6. The system as set forth in claim 5, wherein the PREFRESH protocol is combined with the SHARE protocol by executing the SHARE protocol and periodically executing the PREFRESH protocol.

7. The system as set forth in claim 6, wherein $s^{(k)}$ is a $k^{th}$ secret, where each party $P_j$ has a share $-s_j^{(k)}$, and wherein after an execution of the PREFRESH protocol, each party will obtain a new share $s_j^{(k)}$ that correctly interpolates to $s^{(k)}$ and is distributed independently from $-s_j^{(k)}$.

8. The system as set forth in claim 7, wherein an adversary who obtains $-s_j^{(k)}$ cannot predict the new share $s_j^{(k)}$ provided that $P_j$ is not corrupted during the PREFRESH protocol.

9. A computer-implemented method for constructing a proactively secure secret sharing (PSS) protocol, comprising an act of causing one or more processors to execute instructions stored on a non-transitory memory such that upon execution, the one or more processors perform operations of:

transforming a SHARE protocol into a proactively secure secret sharing (PSS) protocol by performing a PRE-FRESH protocol that includes execution of the SHARE protocol, wherein the PREFRESH protocol refreshes shares of secret data among a plurality of parties of a distributed infrastructure connected through a network, wherein the SHARE protocol is a non-proactively secure secret sharing protocol, and wherein the PSS protocol is used to store data in a distributed fashion across the plurality of parties such that the PSS protocol provides security of the stored data despite unexpected network delays and failures due to malicious attacks on the network by an adversary.

10. The method as set forth in claim 9, wherein the SHARE protocol has a value t less than n/3, where t denotes a corruption threshold, and n denotes a number of parties in the plurality of parties.

11. The method as set forth in claim 9, wherein the one or more processors further perform an operation of initializing the PSS protocol to securely store the secret data among the plurality of parties, wherein security is guaranteed in the presence of an adversary having a set of properties that are equivalent to those of an adversary of the SHARE protocol.

12. The method as set forth in claim 11, wherein security of the PREFRESH protocol is the same as security of the SHARE protocol.

13. The method as set forth in claim 12, wherein the PSS protocol is information secure in an asynchronous network model.

14. A computer program product for constructing a proactively secure secret sharing (PSS) protocol, the computer program product comprising computer-readable instructions stored on a non-transitory computer-readable medium that are executable by a computer having a processor for causing the processor to perform operations of:

transforming a SHARE protocol into a proactively secure secret sharing (PSS) protocol by performing a PRE-FRESH protocol that includes execution of the SHARE protocol, wherein the PREFRESH protocol refreshes shares of secret data among a plurality of parties of a distributed infrastructure connected through a network, wherein the SHARE protocol is a non-proactively secure secret sharing protocol, and wherein the PSS protocol is used to store data in a distributed fashion across the plurality of parties such that the PSS protocol provides security of the stored data despite unexpected network delays and failures due to malicious attacks on the network by an adversary.

15. The computer program product as set forth in claim 14, wherein the SHARE protocol has a value t less than n/3, where t denotes a corruption threshold, and n denotes a number of parties in the plurality of parties.

16. The computer program product as set forth in claim 14, further comprising instructions for causing the processor to perform an operation of initializing the PSS protocol to securely store the secret data among the plurality of parties, wherein security is guaranteed in the presence of an adversary having a set of properties that are equivalent to those of an adversary of the SHARE protocol.

17. The computer program product as set forth in claim 16, wherein security of the PREFRESH protocol is the same as security of the SHARE protocol.

18. The computer program product as set forth in claim 17, wherein the PSS protocol is information secure in an asynchronous network model.

* * * * *